(12) United States Patent
Jentz et al.

(10) Patent No.: US 11,568,686 B2
(45) Date of Patent: Jan. 31, 2023

(54) SYSTEM AND METHOD FOR A VEHICLE DIAGNOSTIC WAKEUP

(71) Applicant: Ford Global Technologies, LLC, Dearborn, MI (US)

(72) Inventors: Robert Jentz, Westland, MI (US); Sanyam Sharma, Dearborn, MI (US); Matthew Carpenter, Northville, MI (US); Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 17/076,479

(22) Filed: Oct. 21, 2020

(65) Prior Publication Data

US 2022/0122384 A1     Apr. 21, 2022

(51) Int. Cl.
*G07C 5/08* (2006.01)
*F02M 25/08* (2006.01)
*F02D 41/00* (2006.01)
*B01D 53/04* (2006.01)
*G06F 1/3296* (2019.01)

(52) U.S. Cl.
CPC ....... *G07C 5/0808* (2013.01); *B01D 53/0415* (2013.01); *F02D 41/003* (2013.01); *F02M 25/0809* (2013.01); *G06F 1/3296* (2013.01); *B01D 2259/4516* (2013.01); *F02D 2200/70* (2013.01)

(58) Field of Classification Search
CPC .............. G07C 5/0808; B01D 53/0415; B01D 2259/4516; F02D 41/003; F02D 2200/70; F02M 25/0809; G06F 1/3296; G06F 1/3203; G06F 1/3243
See application file for complete search history.

(56) References Cited

U.S. PATENT DOCUMENTS

| | | | |
|---|---|---|---|
| 5,263,462 A | 11/1993 | Reddy | |
| 6,321,695 B1 | 11/2001 | Yoo et al. | |
| 8,689,613 B2 | 4/2014 | Perry | |
| 2016/0084175 A1* | 3/2016 | Dudar | F02M 25/0818 123/519 |
| 2016/0177882 A1* | 6/2016 | Dudar | F02D 41/2406 701/22 |
| 2017/0067414 A1* | 3/2017 | Dudar | G07C 5/0808 |
| 2017/0114732 A1* | 4/2017 | Dudar | F02M 25/0854 |
| 2017/0356393 A1* | 12/2017 | Dudar | F02M 25/0809 |
| 2019/0055905 A1* | 2/2019 | Dudar | F02D 41/004 |
| 2019/0108693 A1* | 4/2019 | Dudar | F02M 37/0076 |
| 2019/0186392 A1* | 6/2019 | Dudar | G01M 15/02 |
| 2019/0186422 A1* | 6/2019 | Dudar | B60K 15/03519 |
| 2019/0360380 A1* | 11/2019 | Dudar | F01P 7/14 |

* cited by examiner

*Primary Examiner* — Joseph J Dallo
(74) *Attorney, Agent, or Firm* — Vincent Mastrogiacomo; McCoy Russell LLP

(57) ABSTRACT

Systems and methods for waking a controller from a sleep mode are described. In one example, the controller may be woke in response to an estimated amount of time that it will take for a temperature in an evaporative emissions system to be within a threshold temperature of ambient temperature.

19 Claims, 5 Drawing Sheets

SYSTEM AND METHOD FOR A VEHICLE DIAGNOSTIC WAKEUP

FIELD

The present description relates to methods and systems for waking-up a controller of a vehicle for diagnostic purposes after a vehicle has been shut-off. The methods may predict a time in the future that is appropriate for performing diagnostics.

BACKGROUND AND SUMMARY

A vehicle may be equipped with an evaporative emissions system for reducing an amount of fuel vapor that may escape from a vehicle. The evaporative emissions system may be tested from time to time to ensure a desired level of operation. In particular, a breach diagnostic of the evaporative emissions system may commence after an engine of the vehicle is stopped. The diagnostic may be more reliable if the evaporative emissions system is evaluated at "quiet" conditions. The quiet conditions may reduce system noise so as to reduce a possibility of false positive indications of system issues. The system may be most quiet when a temperature in the evaporative emissions system is within a threshold temperature of a present ambient temperature. However, maintaining a controller in an activated state until such conditions are present may consume significant amounts of electrical power. Therefore, it may be desirable to provide a way of operating a controller in a way that avoids significant power consumption, yet performs evaporative emissions system diagnostics at conditions that may improve diagnostic results.

The inventor herein has recognized the above-mentioned issues and has developed a method for operating a controller of a vehicle, comprising: estimating a time that a temperature at a location in an evaporative emissions system will be within a threshold temperature of ambient temperature; and waking a controller from a sleep mode at the estimated time.

By estimating an amount of time it will take for a temperature in an emissions system to be within a threshold temperature of ambient temperature, it may be possible to provide the technical result of waking a controller at a time that is proper for performing a diagnostic so that battery power is not consumed unnecessarily. Further, when the controller is woke at conditions that may be desirable for performing a diagnostic, it may be possible to avoid exercising system components to reduce a possibility of system degradation.

The present description may provide several advantages. In particular, the methods may reduce unnecessary consumption of battery power. In addition, the methods described herein may help to reduce a possibility of system degradation. Further, waking a controller and performing diagnostics at desirable temperatures, may increase reliability of diagnostic procedures so as to improve diagnostic results.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
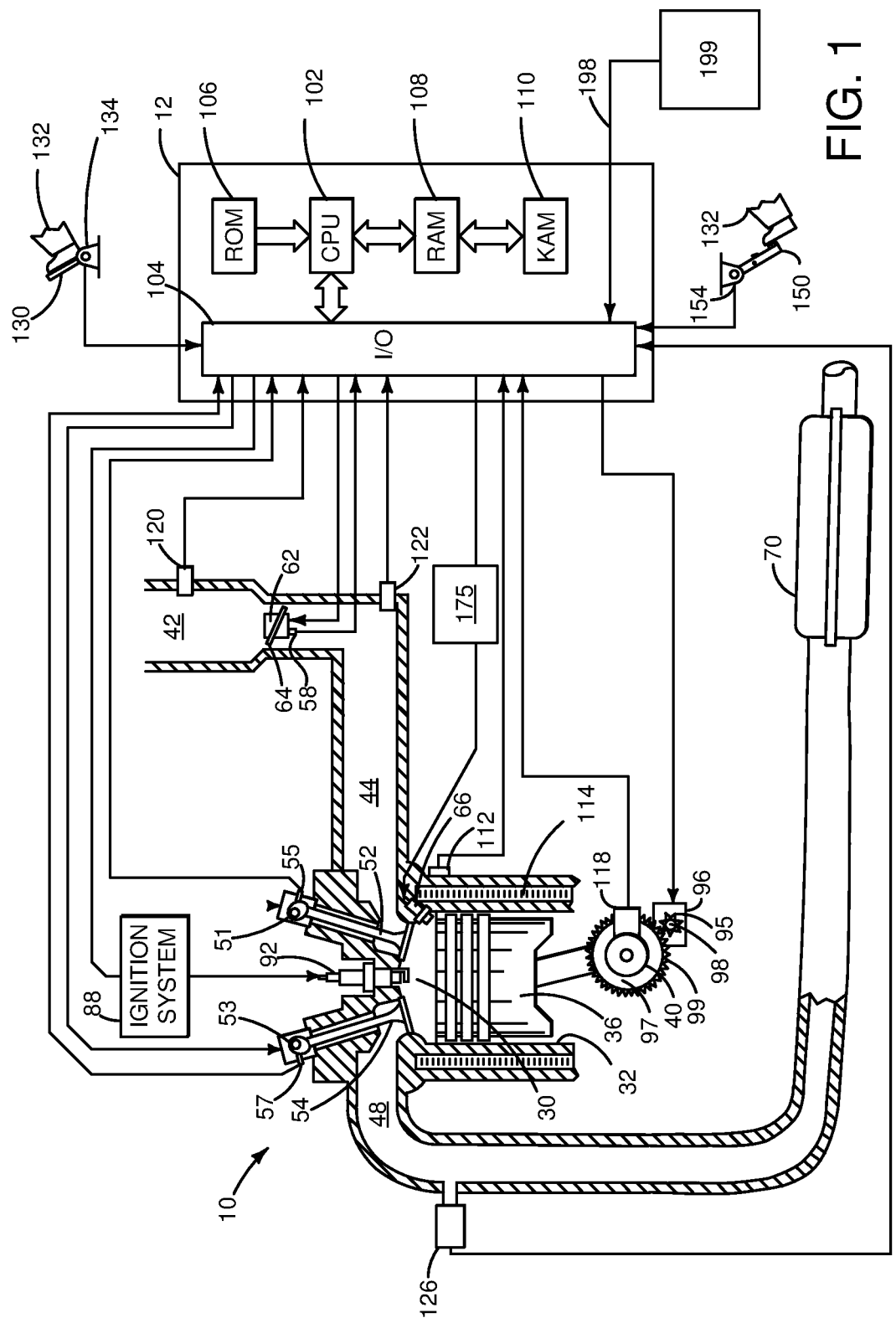
FIG. 1 is a schematic diagram of an engine.
Figure 2:
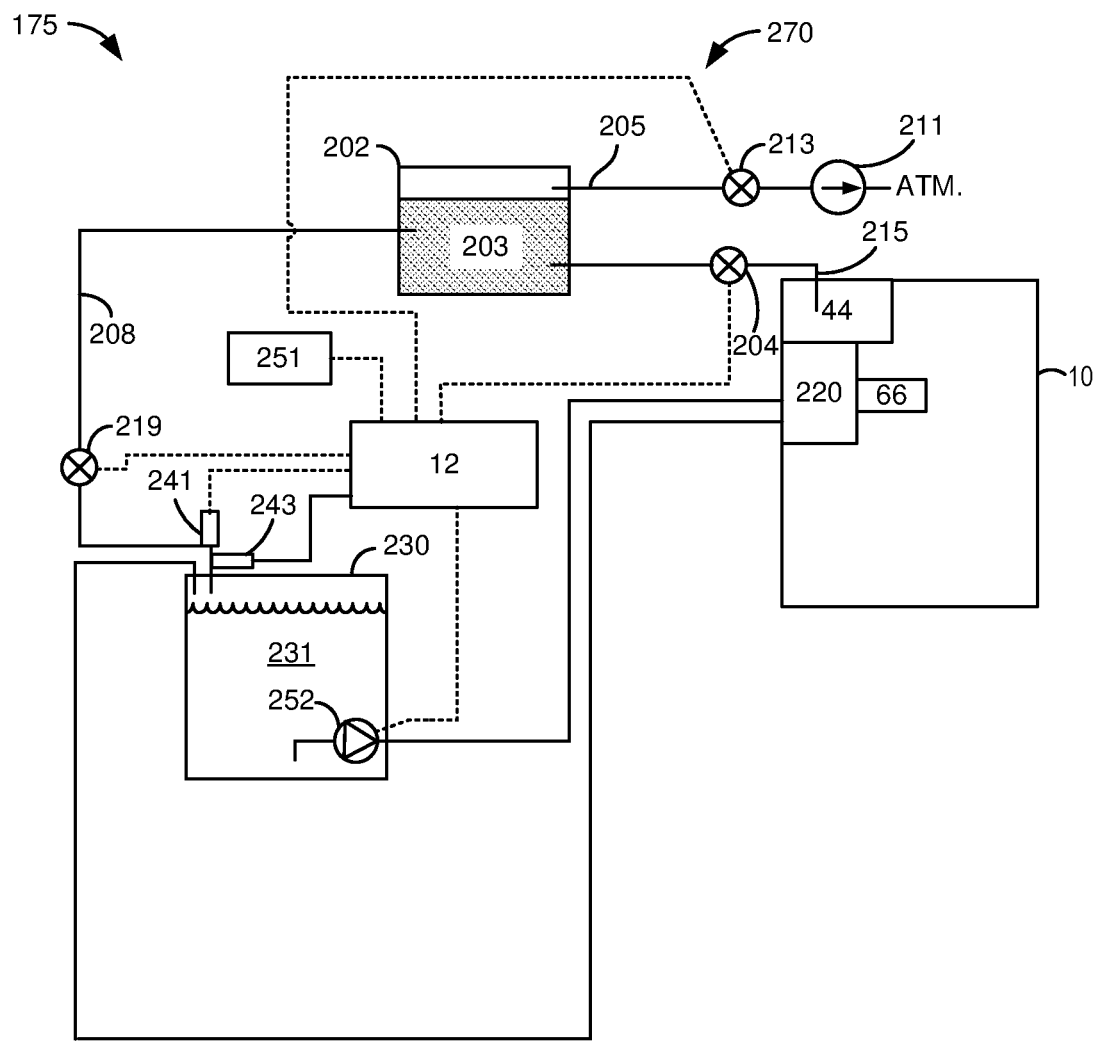
FIG. 2 is a schematic diagram of a first example evaporative emissions system.
Figure 3:
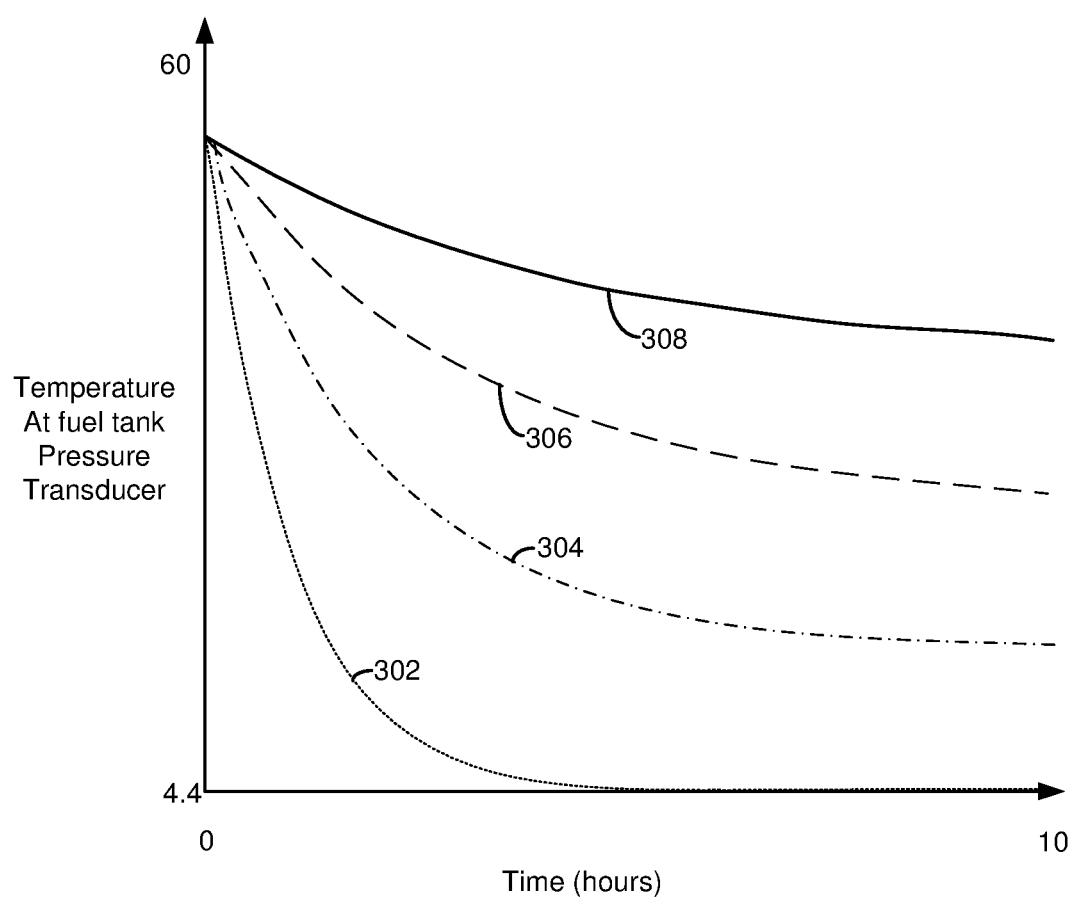
FIG. 3 shows example cooling curves for an evaporative emissions system.
Figure 4:
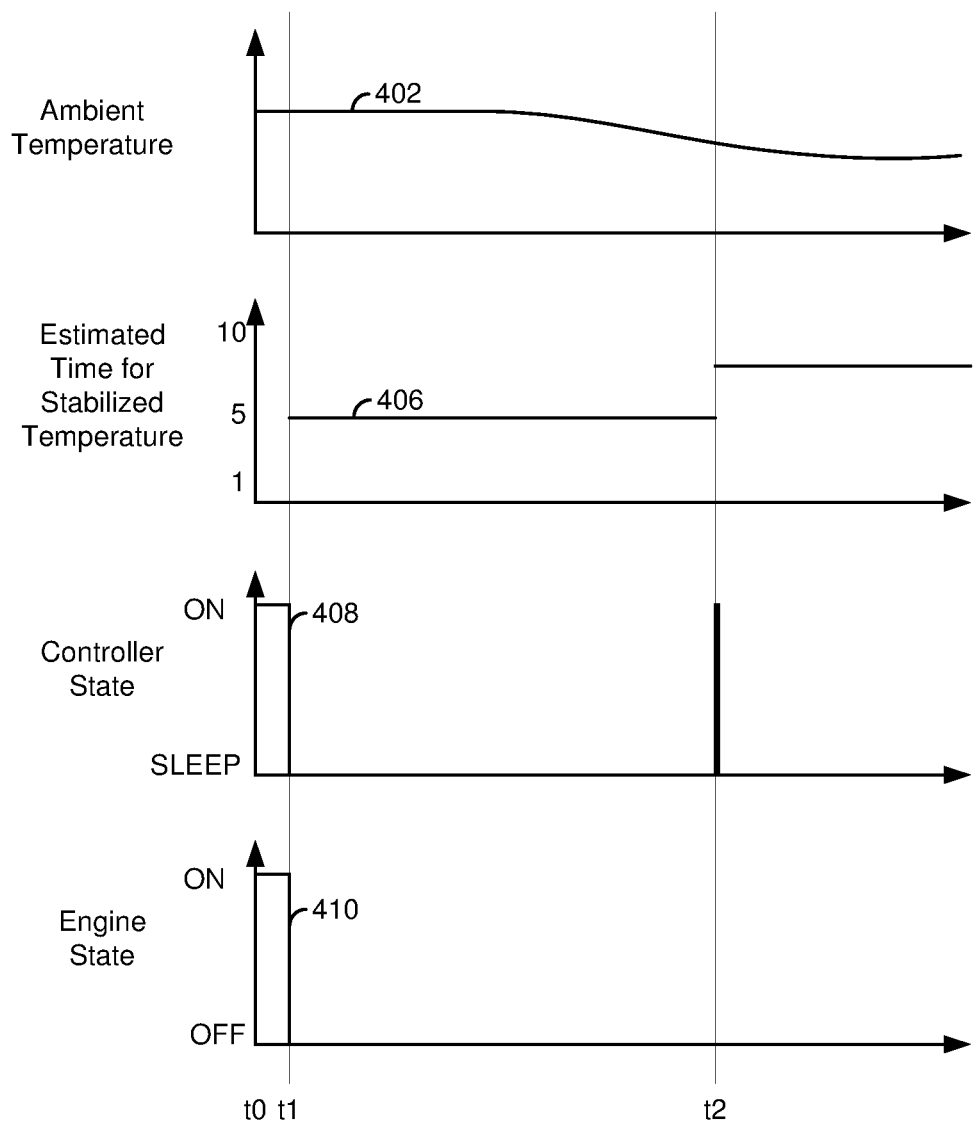
FIG. 4 shows an example sequence where a controller is woke to assess conditions for performing a diagnostic.
Figure 5:
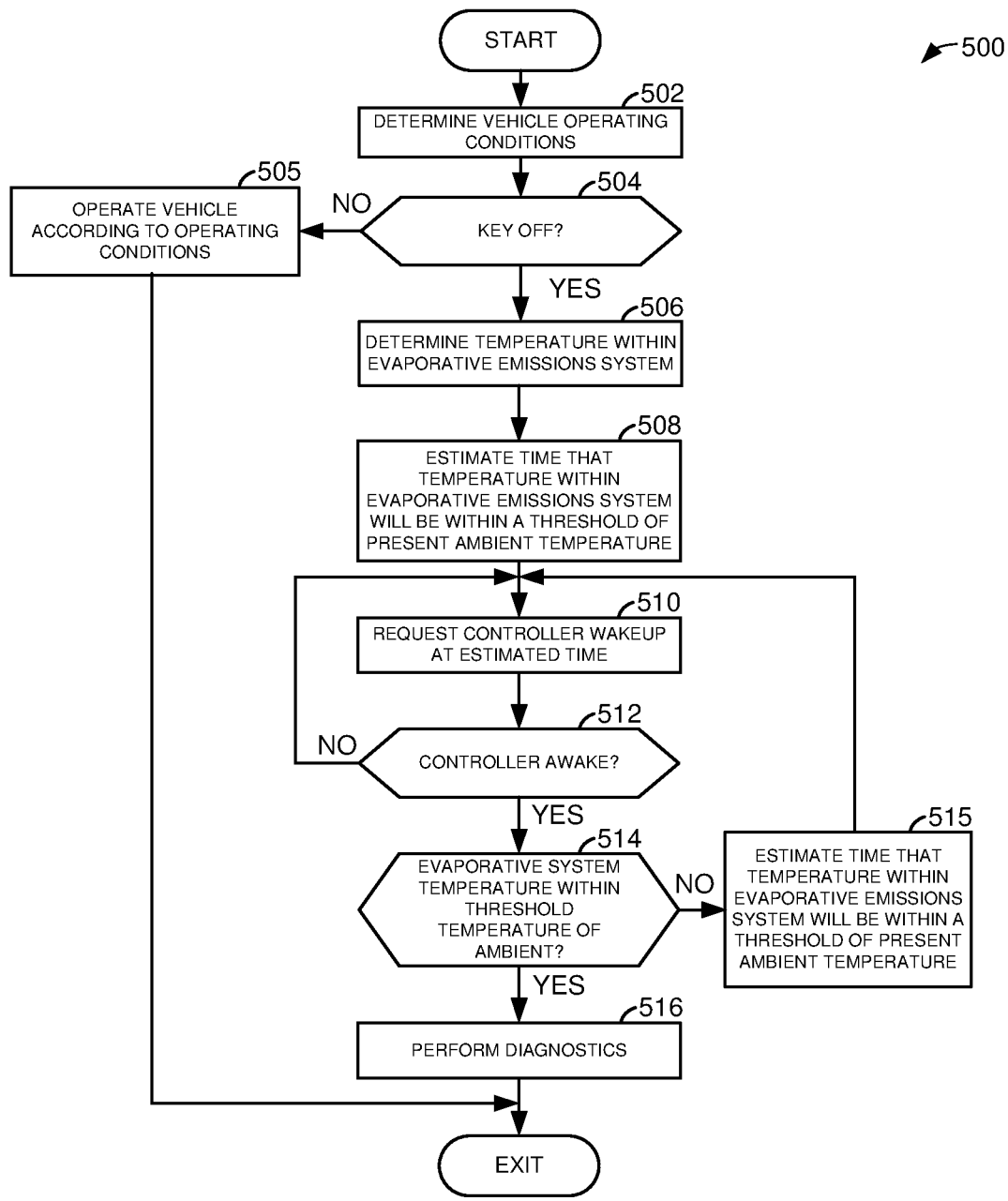
FIG. 5 shows a second method for waking a controller at a time that is beneficial for performing diagnostics.

The present description is related to activating or waking up a controller that is in a sleep mode to perform an evaporative emissions system diagnostic. The controller may consume a small fraction of electric power in a sleep mode as compared to an amount of electric power that the controller consumes during fully activated operation. Therefore, the controller may operate in a sleep mode when limited controller operation is needed to conserve electrical energy. However, the controller may wake to perform diagnostics that are suited to quiet vehicle conditions. For example, the controller may wake to perform a breach test or diagnostic for the evaporative emissions system. If the controller wakes at a time when conditions are not desirable to perform the breach test, power from a battery may be wasted. An engine system is shown in FIG. 1 and an evaporative emissions system that may be included with the engine in a vehicle is shown in FIG. 2. Evaporative emission system cooling curves are shown in FIG. 3. An example controller waking and sleeping sequence is shown in FIG. 4. A method for waking a controller is shown in FIG. 5.

Referring to FIG. 1, internal combustion engine 10, comprising a plurality of cylinders, one cylinder of which is shown in FIG. 1, is controlled by electronic engine controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 shown in greater detail in FIG. 2. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to propulsion force pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine. In addition, controller 12 may communicate with other external controllers 199 (e.g., battery controller, system controller, etc.) via controller area network 198.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Thus, the system of FIGS. 1, 2, and 5 provides for a vehicle system, comprising: an evaporative emissions system of a vehicle including a fuel vapor storage canister and a fuel tank; and a controller including executable instruction stored in non-transitory memory that cause the controller to wake from a sleep mode to an operating mode in response to an estimated amount of time for a temperature of the evaporative emissions system to be within a threshold temperature of ambient temperature. The vehicle system includes where the estimated amount of time is based on Euler's number. The vehicle system includes where the estimated amount of time is determined via a cooling curve. The vehicle system further comprises additional instructions to return the controller to the sleep mode in response to ambient temperature increasing. The vehicle system further comprises additional instructions to estimate a second time for the temperature of the evaporative emissions system to be within the threshold temperature of ambient temperature in response to the ambient temperature increasing. The vehicle system further comprises additional instructions to wake the controller from the sleep mode in response to the second estimated amount of time. The vehicle system further comprises additional instructions to sense a temperature within a fuel tank of the evaporative emissions system. The vehicle system further comprises additional instructions to perform a diagnostic in response to waking the controller from the sleep mode.

Referring now to FIG. 2, an example fuel system 175 is shown in detail. The fuel system of FIG. 2 may supply fuel to engine 10 shown in detail in FIG. 1. Fuel system 175 includes evaporative emission system 270. The system of FIG. 2 may be operated according to the method of FIG. 5. Fuel system components and fluidic conduits are shown as solid lines and electrical connections are shown as dashed lines. The conduits represented by solid lines provide fluidic communication between devices linked by the conduits. Further, the conduits are coupled to the devices from which and to which they lead.

Evaporative emissions system 270 includes a fuel vapor storage canister 202 for storing fuel vapors. Evaporative emissions system 270 also includes carbon 203 for storing and releasing fuel vapors. Fuel vapor storage canister 202 is shown including atmospheric vent conduit 205 along which canister vent valve (CVV) 213 is placed to selectively allow air to flow between atmosphere and fuel vapor storage canister 202. Fuel vapors may be supplied to fuel vapor storage canister 202 via conduit 208 and normally open fuel tank isolation valve (FTIV) 219. Fuel vapors may be purged via canister purge valve (CPV) 204 which allows fluidic communication between fuel vapor storage canister 202 and engine intake manifold 44 or intake 42 via conduit 215. Pump 211 may flow air from canister 202 to atmosphere to generate a vacuum in canister 202 and fuel tank 230.

Engine 10 includes a fuel rail 220 that supplies fuel to direct fuel injector 66. Fuel vapors may be inducted into intake manifold 44 or intake 42 when intake manifold pressure is below atmospheric pressure. Fuel 231 is supplied from fuel tank 230 by fuel pump 252 to fuel rail 220. Pressure in fuel tank 232 may be measured via fuel tank pressure transducer (FTPT) 241 and relayed to controller 12. Fuel tank pressure transducer 241 may also include a temperature sensor 243 in some examples. Controller 12 may receive inputs from the sensors described in FIG. 1 as well as sensor 241. Controller 12 also activates and deactivates CPV 204, CVV 213, FTIV 219, and pump 252 in response to fuel system and engine operating conditions.

In one example, the system of FIG. 2 operates according to the method of FIG. 5 via executable instructions stored in non-transitory memory of controller 12. While engine 10 is operating, fuel vapors from fuel tank 230 may be stored in fuel vapor storage canister 202 in response to temperatures in fuel tank 230 increasing.

Fuel vapors from fuel tank 230 may push air out of CVV 213 when CVV 213 is in a first position and when temperature and/or pressure in fuel tank 230 is increasing. If engine 10 is operating while vapors are being directed to fuel vapor storage canister 202, CPV 204 may be opened so that fuel vapors are drawn into and combusted in engine 10. If engine 10 is not operating or if CPV 204 is closed, fuel vapor may flow into fuel vapor storage canister 202 if temperature and/or pressure in fuel tank 230 increases such that fuel vapors flow to and are stored in fuel vapor storage canister 202.

On the other hand, if engine 10 is not operating or if CPV 204 is closed while temperature and/or pressure in fuel tank 230 is decreasing, fuel vapors from fuel vapor canister 202 may condense in fuel tanks 230 when FTIV 219 is open. FTIV 219 may be a normally open valve that is closed when CPV 204 is open to improve vacuum formation in canister 202, thereby improving evacuation of fuel vapors from fuel vapor storage canister 202. Thus, the fuel system shown in FIG. 2 provides a way of decreasing a volume of the fuel vapor emissions system that is purged so that fuel vapor canister purging may be improved.

Controller 12 may indicate a condition of degradation of the CPV, FTIV, and/or CVV on a display panel 251. Alternatively, 251 may be a light or other device to indicate degradation within the system.

Referring now to FIG. 3, evaporative emission system cooling curves are shown. Each cooling curve represents a temperature at a location in an evaporative emissions system as a function of time. Each cooling curve begins at a higher temperature and ends at a lower temperature. The cooling curves may be indicative of an amount of time it takes for a temperature in an evaporative emissions system to reach a temperature that is within a threshold temperature of ambient temperature.

The vertical axis represents temperature in a fuel tank at a location where pressure in the fuel tank is sensed via a pressure transducer. In one example, the pressure transducer may also include a temperature sensor to compensate for pressures in the evaporative emissions system. The horizontal axis represents an amount of time that the vehicle has been deactivated after the vehicle's engine was stopped at a most recent time. For example, if a vehicle's human driver stops the vehicle's engine via a pushbutton or key switch and exits the vehicle, the amount of time since the vehicle was most recently deactivated begins to accumulate.

Curve 302 represents a cooling curve for an evaporative emissions system when a vehicle is deactivated, a temperature within the evaporative emission system is near 54° C., and ambient temperature is 4° C. Curve 304 represents a cooling curve for an evaporative emissions system when a vehicle is deactivated, a temperature within the evaporative emission system is near 54° C., and ambient temperature is 15° C. Curve 306 represents a cooling curve for an evaporative emissions system when a vehicle is deactivated, a temperature within the evaporative emission system is near 54° C., and ambient temperature is 26° C. Curve 308 represents a cooling curve for an evaporative emissions system when a vehicle is deactivated, a temperature within the evaporative emission system is near 54° C., and ambient temperature is 38° C.

The time that each curve is reduced to roughly 37% of a difference between its initial value and its final value is the time constant for the curve. For example, the initial value of curve 302 is 54° C. (e.g., temperature in the evaporative emission system when the vehicle's engine is stopped) and its final value is 4.4° C. (e.g., ambient temperature). Therefore, the time that curve 302 is reduced to 22.75° C. (e.g., 37% of the difference between the curve's initial value and its final value) is the time constant (tc). The time constant in this example was determined via the following calculation: (54° C.−4.4° C.)*0.37+4.4° C.=22.75° C. The time constant may be applied as mentioned in method 500 to determine controller wake time. In this example, the time constant for curve 302 is about one hour and six minutes. The curves may be stored in controller memory as equations that are determined via regressing data that the curves are generated from.

Referring now to FIG. 4, a sequence for waking a controller is shown. The sequence of FIG. 4 may be performed via the system of FIGS. 1 and 2 in cooperation with the method of FIG. 5.

The first plot from the top of FIG. 4 is a plot of ambient temperature versus time since a most recent deactivation of a vehicle, including the vehicle's engine. The vertical axis represents ambient temperature and ambient temperature increases in the direction of the vertical axis arrow. The horizontal axis represents time and time increases in the direction of the horizontal axis. Trace 402 represents ambient temperature.

The second plot from the top of FIG. 4 is a plot of an estimated amount time it will take for a temperature in the vehicle's evaporative emissions system to reach a stabilized temperature. The vertical axis represents an estimated amount time it will take for a temperature in the vehicle's evaporative emissions system to reach a stabilized temperature and the amount of time increases in the direction of the vertical axis arrow. The horizontal axis represents time and time increases in the direction of the horizontal axis. Trace 404 represents an estimated amount time it will take for a temperature in the vehicle's evaporative emissions system to reach a stabilized temperature.

The third plot from the top of FIG. 4 is a plot of controller state (e.g., sleep mode and on or activated mode) versus time since a most recent deactivation of a vehicle, including the vehicle's engine. The vertical axis represents controller state and two controller states are indicated along the vertical axis. The horizontal axis represents time and time increases in the direction of the horizontal axis. Trace 406 represents controller state.

The fourth plot from the top of FIG. 4 is a plot of engine state (e.g., on or activated and off) versus time since a most recent deactivation of a vehicle, including the vehicle's engine. The vertical axis represents engine state and two engine states are indicated along the vertical axis. The horizontal axis represents time and time increases in the direction of the horizontal axis. Trace 408 represents controller state.

At time t0, ambient temperature is at a higher level and the estimated amount of time for the evaporative emissions system to reach a stabilized temperature is not determined. The controller is in an on or activated state and the engine is on (e.g., rotating and combusting fuel).

At time t1, the engine and the controller are shut-down. In particular, combustion in the engine ceases and an amount of electric power consumed by the controller is decreased so that the controller has limited functionality. In other words, the controller state is changed from "on" where the controller features full functionality to "sleep" mode where the controller may only perform a small subset of its overall functionality. For example, in sleep mode, the controller may monitor one or more inputs that are a basis for waking the controller from the sleep mode; however, the controller may not perform diagnostics, evaporative emissions procedures, or operate the engine. The controller may perform all of the mentioned functions in an "on" mode.

The controller also estimates an amount of time that it will take for a temperature in the evaporative emissions system (e.g., a temperature in a fuel tank) to be within a threshold temperature of ambient temperature (not show). In this example, the time for the evaporative emissions system temperature to be within a threshold temperature of ambient temperature is time t2 or five hours.

At time t2, the controller is woke at a time estimated to be when a temperature of an evaporative emissions system is expected to be within a threshold temperature of ambient temperature. The controller state changes from "sleep" to "ON" and the engine remains deactivated. The controller does not begin to perform a diagnostic at time t2 because ambient temperature has changed from the time that the controller and vehicle were deactivated at time t1. In particular, the ambient temperature has decreased so that the temperature of the evaporative emissions system is not within a threshold temperature of ambient temperature. Therefore, the controller determines a second time that the temperature in the evaporative emissions system is expected to be within a threshold temperature of ambient temperature. The second time is two hours later than time t2. Accordingly, the controller state is switched back to "sleep" mode since the evaporative emissions temperature is not within a threshold temperature of ambient temperature.

Thus, a time that a controller wakes may be based on a temperature in an evaporative emissions system and ambient temperature. Further, if the controller wakes and the evaporative emissions system temperature is not within a threshold temperature of ambient temperature, the controller may estimate a second time that the evaporative emissions system temperature is expected to be within a threshold temperature of ambient temperature.

Referring now to FIG. 5, a method for waking a controller from sleep mode and performing an evaporative emission diagnostic is shown. The method may be included in the system of FIGS. 1 and 2 as executable instructions stored in non-transitory memory of controller 12. The method of FIG. 5 may cause controller 12 to transform operating states of devices and actuators in the physical world.

At 502, method 500 determines vehicle operating conditions. Vehicle operating conditions may include, but are not limited to an evaporative emissions system temperature, ambient temperature, engine speed, engine load, amount of time since the controller was last activated, evaporative emissions system pressure, and driver demand torque. Method 500 proceeds to 504.

At 504, method 500 determines if the vehicle is in a deactivated state. For example, method 500 may determine if the vehicle's engine is not rotating and combusting fuel. Method 500 may determine the vehicle's operating state via a position of a key switch, pushbutton, or other device that has a sole purpose of activating and deactivating the vehicle. If method 500 judges that the vehicle is not deactivated the answer is no and method 500 proceeds to 505. Otherwise, the answer is yes and method 500 proceeds to 506.

At 505, method 500 operates the vehicle according to vehicle operating conditions. For example, method 500 may command an engine to provide a requested driver demand torque in response to a position of a propulsion request pedal. Method 500 may also store and purge fuel vapors from the evaporative emissions system. Method 500 proceeds to exit.

At 506, method 500 determines a temperature within an evaporative emissions system. In one example, the temperature is a temperature within a fuel tank. In other examples, the temperature may be a temperature within a fuel vapor storage canister. The temperature may be determined via a temperature sensor. Method 500 proceeds to 508.

At 508, method 500 estimates a time at which a temperature of the evaporative emissions system will be within a threshold temperature of ambient temperature. In one example, the time may be determined by solving the following equation for time t:

$$0.37 \cdot (TFTPT-AAT) = (TFTPT-AAT) \cdot e^{-t/tc}$$

where TFTPT is the temperature of the evaporative emissions system when the vehicle's engine is most recently stopped, or alternatively, the temperature of the evaporative emissions system when the vehicle's controller most recently prepared to enter "sleep" mode, AAT is ambient temperature when the vehicle's engine is most recently stopped, or alternatively, ambient temperature when the vehicle's controller most recently prepared to enter "sleep" mode, e is Euler's number, t is the present time, and tc is a time constant of a cooling curve. The time constant of the cooling curve is determined from a cooling curve that is based on a temperature in the evaporative emissions system at a time when the controller most recently prepared to enter "sleep" mode or temperature in the evaporative emissions system at a time when the engine was most recently stopped (e.g., not rotating and combusting fuel). The time constant may be determined via an evaporative emissions system cooling curve as shown in FIG. 3. The time constant and time constants of other evaporative emissions system cooling curves may be stored in controller memory and retrieved based on ambient temperature at the most recent time that the controller prepared to enter "sleep" mode and temperature in the evaporative emissions system at the most recent time that the controller prepared to enter "sleep" mode.

Method 500 enters sleep mode after time t is determined. Method 500 proceeds to 510 after the value t is determined.

At 510, method 500 requests that the controller (e.g., controller 12 of FIG. 1) exits "sleep" mode at the requested time t. The amount of time t begins when the controller enters "sleep" mode at a most recent time and the controller is requested to wake in the future after the amount of time t has passed since the controller most recently entered "sleep" mode. Thus, if the controller entered "sleep" mode at 1 PM and t is 2 hours, the controller is requested to wake at 3 PM. The controller may wake itself up at time t in the future or another controller may request that the controller wake up at time t. For example, a battery controller may request that controller 12 exit "sleep" mode at time t and turn on such that controller 12 may perform an emissions system diagnostic. Method 500 proceeds to 512.

At 512, method 500 judges if the controller is awake. The controller may wake after the amount of time t has passed since the controller entered "sleep" mode most recently. If method 500 judges that the controller is awake, the answer is yes and method 500 proceeds to 514. Otherwise, the answer is no and method 500 returns to 510.

At 514, method 500 judges if the temperature in the evaporative emissions system is within a threshold temperature of ambient temperature at the present time. If so, the answer is yes and method 500 proceeds to 516. Otherwise, the answer is no and method 500 proceeds to 516. The temperature of the evaporative emissions system may not be within a threshold temperature of a present ambient temperature if ambient temperature increases or decreases while the controller is in sleep mode.

At 515, method 500 estimates a time that the temperature within the evaporative emissions system will be within a threshold temperature of present ambient temperature. Method 500 estimates the time based on the equation described at 508. In this example, AAT is the present ambient temperature and TFTPT is the present temperature of the evaporative emissions system. Thus, method 500 may determine the time that the temperature in the evaporative emissions system will be within a threshold temperature of the present ambient temperature based on a second curve that is different than the first curve used at 508 to determine an initial estimate of the time that the evaporative emissions system temperature will be within a threshold temperature of the present ambient temperature. The time constant of the cooling curve is determined from a second cooling curve that is based on a temperature in the evaporative emissions system at a time when the controller most recently prepared to enter "sleep" mode or the present temperature in the evaporative emissions system. Method 500 enters sleep mode after time t is determined. Method 500 returns to 510 after the value t is determined.

At 516, method 500 performs an evaporative emissions system diagnostic. In one example, method 500 judges if a breach (e.g., unintended entry or exit of air into the evaporative emissions system) is present in the evaporative emissions system. The breach may be detected via closing one or more valves in the evaporative emissions system after a vacuum is drawn in the evaporative emissions system. If pressure increases in the evaporative emissions system by more than a predetermined amount in a predetermined amount of time, a breach of the system may be determined. Method 500 may produce a vacuum in the evaporative emissions system via activating pump 211 shown in FIG. 2. If a breach is detected, the vehicle's operator or a service center may be notified of the breach. Method 500 proceeds to exit.

Thus, the method of FIG. 5 provides for waking a controller that is in a power consumption reducing "sleep" mode based on an estimated amount of time it will take for an evaporative emissions system to reach ambient temperature. This may reduce unnecessary controller waking, thereby reducing electric power consumption.

The method of FIG. 5 provides for a method for operating a controller of a vehicle, comprising: estimating a time that a temperature at a location in an evaporative emissions system will be within a threshold temperature of ambient temperature; and waking a controller from a sleep mode at the estimated time. The method includes wherein the time is estimated according to one of a plurality of cooling curves. The method includes where each of the plurality of cooling curves follow an exponential decay trajectory. The method includes where the sleep mode is a mode where operation of the controller is reduced to a first power consumption level that is lower than when a power consumption level of the controller when the vehicle is activated. The method further comprises beginning a diagnostic after waking the controller, the diagnostic performed without the vehicle being activated by a user. The method includes where the diagnostic is an evaporative emissions breach check. The method includes where the time is determined via Euler's number.

The method of FIG. 5 also provides for a method for operating an evaporative emissions system, comprising: estimating a time that a temperature at a location in an evaporative emissions system will be within a threshold temperature of ambient temperature; waking a controller from a sleep mode at the estimated time; and entering the controller to the sleep mode in response to the temperature at the location not being within the threshold temperature of ambient temperature. The method further comprises performing a diagnostic in response to the controller being within the threshold temperature of ambient temperature after waking the controller. The method includes where the diagnostic is a breach check. The method includes where the time is estimated from one of a plurality of evaporative emissions system cooling curves. The method further comprises selecting one of the plurality of evaporative emissions system cooling curves based on ambient temperature to estimate the time.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a controller of a vehicle, comprising:
   estimating a time that a temperature at a location in an evaporative emissions system will be within a threshold temperature of ambient temperature based on the temperature at the location; and waking a controller from a sleep mode at the estimated time.

2. The method of claim 1, wherein the time is estimated according to one of a plurality of cooling curves.

3. The method of claim 2, where each of the plurality of cooling curves follow an exponential decay trajectory.

4. The method of claim 1, where the sleep mode is a mode where operation of the controller is reduced to a first power consumption level that is lower than when a power consumption level of the controller when the vehicle is activated.

5. The method of claim 1, further comprising beginning a diagnostic after waking the controller, the diagnostic performed without the vehicle being activated by a user.

6. The method of claim 5, where the diagnostic is an evaporative emissions breach diagnostic.

7. The method of claim 1, where the time is determined via Euler's number.

8. A vehicle system, comprising:
an evaporative emissions system of a vehicle including a fuel vapor storage canister and a fuel tank; and
a controller including executable instruction stored in non-transitory memory that cause the controller to wake from a sleep mode to an operating mode in response to an estimated amount of time for a temperature of the evaporative emissions system to be within a threshold temperature of ambient temperature, where the estimated amount of time is based on Euler's number.

9. The vehicle system of claim 8, where the estimated amount of time is determined via a cooling curve.

10. The vehicle system of claim 9, further comprising additional instructions to return the controller to the sleep mode in response to ambient temperature increasing.

11. The vehicle system of claim 10, further comprising additional instructions to estimate a second time for the temperature of the evaporative emissions system to be within the threshold temperature of ambient temperature in response to the ambient temperature increasing.

12. The vehicle system of claim 11, further comprising additional instructions to wake the controller from the sleep mode in response to the second estimated amount of time.

13. The vehicle system of claim 12, further comprising additional instructions to sense a temperature within a fuel tank of the evaporative emissions system.

14. The vehicle system of claim 8, further comprising additional instructions to perform a diagnostic in response to waking the controller from the sleep mode.

15. A method for operating an evaporative emissions system, comprising:
estimating a time that a temperature at a location in an evaporative emissions system will be within a threshold temperature of ambient temperature, where the time is estimated from Euler's number;
waking a controller from a sleep mode at the estimated time; and
entering the controller to the sleep mode in response to the temperature at the location not being within the threshold temperature of ambient temperature.

16. The method of claim 15, further comprising performing a diagnostic in response to the controller being within the threshold temperature of ambient temperature after waking the controller.

17. The method of claim 16, where the diagnostic is a breach diagnostic.

18. The method of claim 16, where the time is estimated from one of a plurality of evaporative emissions system cooling curves.

19. The method of claim 15, further comprising selecting one of the plurality of evaporative emissions system cooling curves based on ambient temperature to estimate the time.

* * * * *